United States Patent
Groen (10) Patent No.: US 11,827,357 B2
(45) Date of Patent: Nov. 28, 2023

(54) PRECISION DELIVERY VEHICLE INCLUDING FOLDING WINGS AND DEPLOYABLE, UNPOWERED ROTOR

(71) Applicant: Skyworks Aeronautics Corp., Salt Lake City, UT (US)

(72) Inventor: David Groen, Murray, UT (US)

(73) Assignee: Skyworks Aeronautics Corp, Chicago, IL (US)

( * ) Notice: Subject to any disclaimer, the term of this patent is extended or adjusted under 35 U.S.C. 154(b) by 129 days.

(21) Appl. No.: 17/475,207

(22) Filed: Sep. 14, 2021

(65) Prior Publication Data

US 2022/0001983 A1 Jan. 6, 2022

Related U.S. Application Data (62) Division of application No. 15/938,227, filed on Mar. 28, 2018, now Pat. No. 11,117,666.

(60) Provisional application No. 62/477,939, filed on Mar. 28, 2017.

(51) Int. Cl.

| | |
|---|---|
| *B64D 1/12* | (2006.01) |
| *B64C 3/56* | (2006.01) |
| *B64C 39/02* | (2023.01) |
| *B64U 30/12* | (2023.01) |
| *B64U 30/20* | (2023.01) |
| *B64U 80/82* | (2023.01) |
| *B64C 29/02* | (2006.01) |

(Continued)

(52) U.S. Cl.
CPC .................. *B64D 1/12* (2013.01); *B64C 3/56* (2013.01); *B64C 29/02* (2013.01); *B64C 39/024* (2013.01); *B64D 17/80* (2013.01); *B64U 30/12* (2023.01); *B64U 30/20* (2023.01); *B64U 80/82* (2023.01); *B64U 2101/60* (2023.01)

(58) Field of Classification Search
CPC .. B64D 1/12; B64D 17/80; B64C 3/56; B64C 29/02; B64C 39/024; B64C 2201/102; B64C 2201/108
USPC ........................................................ 244/7 R
See application file for complete search history.

(56) References Cited

U.S. PATENT DOCUMENTS 3,258,230 A * 6/1966 Bollinger ................. B64D 1/02
24/370
3,515,500 A * 6/1970 Nachod ............... B64C 29/0033
244/12.3

(Continued)

*Primary Examiner* — Brady W Frazier
(74) *Attorney, Agent, or Firm* — The Watson IP Group, PLC; Jovan N. Jovanovic (57) ABSTRACT

A precision delivery vehicle having a vehicle body assembly, a fixed wing system, a rotor system and a guidance system. The vehicle body assembly can retain a payload. The fixed wing system includes first and second wings coupled to the vehicle body for fixed wing flight. The rotor system includes a mast structure, a rotor hub rotatable about the mast structure and at least two rotor blades coupled to the rotor hub and rotatable with the rotor hub relative to the mast structure. The at least two rotor blades are movable between a collapsed configuration and a deployed configuration. In the collapsed configuration, the precision delivery vehicle is in fixed wing flight. Upon placement of the at least two rotor blades into the deployed configuration, the precision delivery vehicle is placed into rotative flight. The guidance system is structurally configured to direct the precision delivery vehicle to a target.

7 Claims, 8 Drawing Sheets

(51) Int. Cl.
   *B64D 17/80*     (2006.01)
   *B64U 101/60*    (2023.01)

(56) References Cited

U.S. PATENT DOCUMENTS

| | | | | |
|---|---|---|---|---|
| 3,582,021 A * | 6/1971 | Pender | B64C 29/02 | 416/142 |
| 3,762,667 A * | 10/1973 | Pender | B64C 29/0033 | 244/17.19 |
| 5,085,315 A * | 2/1992 | Sambell | B64C 27/30 | 244/6 |
| 5,760,330 A * | 6/1998 | Himmert | F42B 10/56 | 102/374 |
| 5,780,766 A * | 7/1998 | Schroppel | F42B 12/16 | 102/308 |
| 6,561,455 B2 * | 5/2003 | Capanna | B64C 29/02 | 244/7 B |
| 6,622,962 B1 * | 9/2003 | White | B64C 27/26 | 244/12.3 |
| 9,187,184 B2 * | 11/2015 | Miralles | F41F 3/042 | |
| 2001/0025901 A1 * | 10/2001 | Frucht | F42B 12/58 | 244/3.1 |
| 2005/0218260 A1 * | 10/2005 | Corder | B64C 3/56 | 244/49 |
| 2006/0255205 A1 * | 11/2006 | Gleich | B64C 39/024 | 244/49 |
| 2007/0018033 A1 * | 1/2007 | Fanucci | F42B 15/22 | 244/49 |
| 2010/0025543 A1 * | 2/2010 | Kinsey | B64C 39/024 | 244/7 A |
| 2010/0282917 A1 * | 11/2010 | O'Shea | B64C 39/068 | 244/49 |
| 2012/0267473 A1 * | 10/2012 | Tao | B64C 5/12 | 244/46 |
| 2015/0142210 A1 * | 5/2015 | Warsop | F42B 15/08 | 701/2 |
| 2018/0086454 A1 * | 3/2018 | Cook | B64C 13/30 | |

\* cited by examiner

PRECISION DELIVERY VEHICLE INCLUDING FOLDING WINGS AND DEPLOYABLE, UNPOWERED ROTOR

CROSS-REFERENCE TO RELATED APPLICATION

This present application is a divisional of U.S. patent application Ser. No. 15/938,227 filed on Mar. 28, 2018, entitled "PRECISION DELIVERY VEHICLE", which claims priority from U.S. Provisional Pat. App. Ser. No. 62/477,939 filed on Mar. 28, 2017, entitled "Precision Delivery Vehicle", the entire specification of which is hereby incorporated by reference in its entirety.

RIGHTS OF THE U.S. GOVERNMENT

This invention was made with Government support under Agreement No. HR0011-06-9-0002 awarded by DARPA. The Government has certain rights in the disclosure.

BACKGROUND OF THE DISCLOSURE

1. Field of the Disclosure

The disclosure relates in general to an aircraft with both fixed wing and rotating wing capabilities, and more particularly, to a precision delivery vehicle configured to deliver a payload to a target utilizing both fixed wing and rotating wing capabilities.

2. Background Art

In certain situations, there is a need to aerially deliver a payload to designated landing zones or targets. This may be done using fixed wing aircraft. It may also be done using rotorcraft. In many instances, the use of either type of vehicle is problematic.

For example, in some instances, the target is located in a remote location that is generally inaccessible or difficult to access by an airborne vehicle. In other instances, the target is located in a dangerous zone, where it may be difficult or impossible to safely direct an aircraft.

Where vehicles cannot be directly landed at or near the target, payloads can be dropped with a parachute so as to descend to a target area, while the fixed wing aircraft or rotorcraft can remain a safe distance away from the target. While such a system can deliver a payload to a target while minimizing danger to the delivery vehicle, problems do exist with such payload delivery.

Among other issues, the payload cannot be accurately delivered to a small target area. For example, the landing area of such a payload is controlled by the conditions and airflow patterns surrounding the payload. Wind shifts, and changes in the atmosphere can impact the location of the landing. Also, the higher the aircraft, the more difficult it is to deliver the payload accurately to the target.

Furthermore, in many instances, the target is quite remote and pinpoint accuracy is required to deliver the payload to the target. In such instances, the use of parachutes to deliver such a payload is not realistic. The payload can land miles away from the intended target. Where the region is remote and generally inaccessible, the payload would be considered lost and irretrievable.

What is desirable, is a system by which payloads can be delivered with increased accuracy to a target.

SUMMARY OF THE DISCLOSURE

The disclosure is directed to a precision delivery vehicle comprising a vehicle body assembly, a fixed wing system, a rotor system and a guidance system. The vehicle body assembly has a central elongated fuselage and is structurally configured to retain a payload. The fixed wing system includes a first wing and a second wing coupled to the vehicle body for fixed wing flight. The rotor system includes a mast structure, a rotor hub rotatable about the mast structure and at least two rotor blades coupled to the rotor hub and rotatable with the rotor hub relative to the mast structure. The at least two rotor blades are movable between a collapsed configuration and a deployed configuration. In the collapsed configuration, the precision delivery vehicle is in fixed wing flight. Upon placement of the at least two rotor blades into the deployed configuration, the precision delivery vehicle is placed into rotative flight. The guidance system is structurally configured to direct the precision delivery vehicle to a target.

In some configurations, the precision delivery vehicle further includes a fixed wing stabilizer system coupled to the vehicle body assembly.

In some configurations, the vehicle body assembly further includes a tail portion, with the fixed wing stabilizer system coupled to the tail portion.

In some configurations, the tail portion is releasably coupled to the vehicle body assembly.

In some such configurations, at least a portion of the rotor system is exposed upon release of the tail portion from the vehicle body assembly.

In some such configurations, the at least two rotor blades are disposed within an inner cavity of the central elongated fuselage. Upon release of the tail portion of the vehicle body, the at least two rotor blades extend from the inner cavity and into the deployed configuration.

In some configurations, the first wing and the second wing are foldable and positionable between a collapsed configuration and a deployed configuration.

In some such configurations, one of the first wing and the second wing are releasably coupled to the vehicle body assembly, and released when the precision delivery vehicle is in rotative flight, with a remaining one of the first wing and the second wing increasing area moment inches aft of the center of gravity.

In some configurations, in fixed wing flight, the central elongated fuselage is substantially horizontal. In rotative flight, the central elongated fuselage is substantially vertical.

In another aspect of the disclosure, the disclosure is directed to a precision delivery vehicle having a vehicle body, a fixed wing stabilizer system, a fixed wing system, a rotor system and a guidance system. The vehicle body assembly has a central elongated fuselage, a nose portion at a first end of the central elongated fuselage and a tail portion at a second end of the central elongated fuselage. The vehicle body assembly is configured to retain a payload. The fixed wing stabilizer system is positioned at the second end of the central elongated fuselage. The fixed wing system is positioned between the first end and the second end of the central elongated fuselage. The fixed wing system includes a first foldable wing; a second foldable wing; and a pivot structure configured to direct the first and second foldable wings between a collapsed configuration and a deployed configuration.

The rotor system includes a rotary flight assembly, the rotary flight assembly including a mast structure attached to the vehicle body assembly; a rotor hub rotatably coupled to the mast structure; a first blade having a root portion coupled to the rotor hub, and an elongated blade portion hingedly coupled to the root portion; and a second blade having a root portion coupled to the rotor hub, and an elongated blade portion hingedly coupled to the root portion. The guidance system structurally configured to direct the precision delivery vehicle to a target.

In some configurations, the first blade and the second blade are positionable in a collapsed configuration and a deployed configuration. In the collapsed configuration, the elongated blade portion of each of the first blade and the second blade are positionable so as to extend along an outer body or within an inner cavity of the central elongated fuselage.

In some configurations, in a collapsed configuration, the first and second foldable wings extend along an outer body of the central elongated fuselage.

In some configurations, one of the first foldable wing and the second foldable wing are removable after being positioned in the deployed configuration.

In some configurations, the tail portion is releasably coupled to the central elongated fuselage.

In some configurations, the tail portion is collapsible against the second end of the central elongated fuselage.

In some configurations, the vehicle body assembly further includes a payload container releasably attachable to the central elongated fuselage.

In another aspect of the disclosure, the disclosure is directed to a method of utilizing a precision delivery vehicle to deliver a payload to a target comprising: providing a precision delivery vehicle; releasing the precision delivery vehicle at a delivery altitude; utilizing the fixed wing system to achieve a fixed wing flight; deploying the at least two rotor blades into a deployed configuration; utilizing the at least two rotor blades to achieve rotative flight, and guiding the precision delivery vehicle to the target.

In some configurations, the first and second wings are movable from collapsed configuration to a deployed configuration. In the step of releasing the precision delivery vehicle, the first and second wings are in a collapsed configuration. Additionally, the method further includes the step of deploying the first and second wings into a deployed configuration prior to the step of utilizing the fixed wing system.

In some configurations, the method further comprises the step of releasing one of the first and second wings after the step of utilizing the fixed wing system, to, in turn have the other of the first and second wings increase area moment inches aft of the center of gravity.

In some configurations, the step of guiding further includes the step of moving the mast structure to, in turn, control the pitch-and-roll of the precision delivery vehicle.

In some configurations, all of the components of the vehicle that are deployed from the aircraft reach the ground with the vehicle, so that the components are not littered or otherwise disposed.

BRIEF DESCRIPTION OF THE DRAWINGS

The disclosure will now be described with reference to the drawings wherein:

FIGS. 1 and 1a of the drawings is a perspective view of a configuration of the precision delivery vehicle showing the fixed wing system, the fixed wing stabilizer system and the rotor system in a stowed configuration, with the vehicle body assembly being substantially transparent in FIG. 1 and opaque in FIG. 1a;

FIG. 2 of the drawings is a perspective view of a configuration of the precision delivery vehicle showing the fixed wing system and the fixed wing stabilizer system in the deployed configuration, wherein the precision delivery vehicle is in a glide configuration, with the vehicle body assembly being substantially transparent in FIG. 2 and opaque in FIG. 2a;

DETAILED DESCRIPTION OF THE DISCLOSURE

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 1:
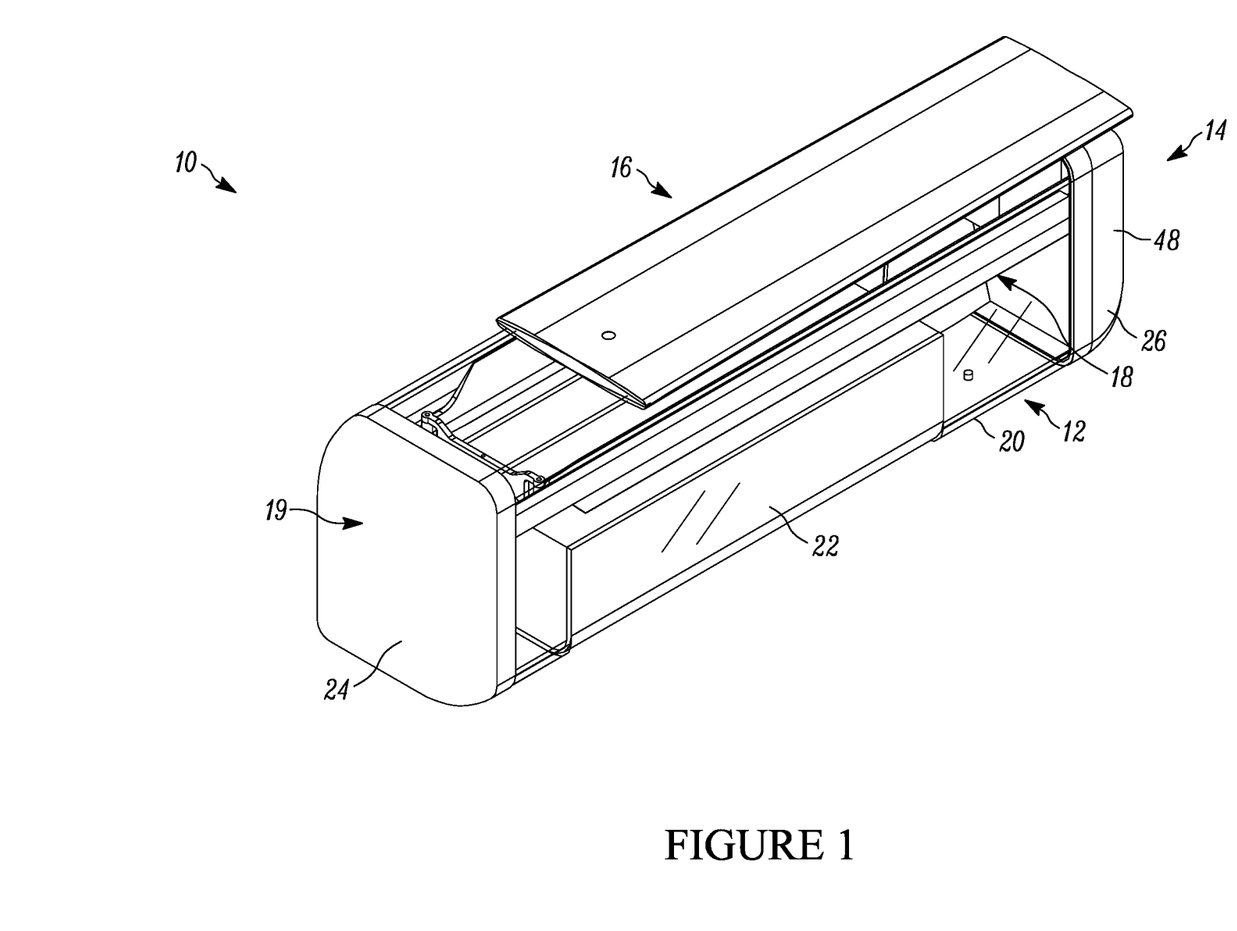
Figure 1A:
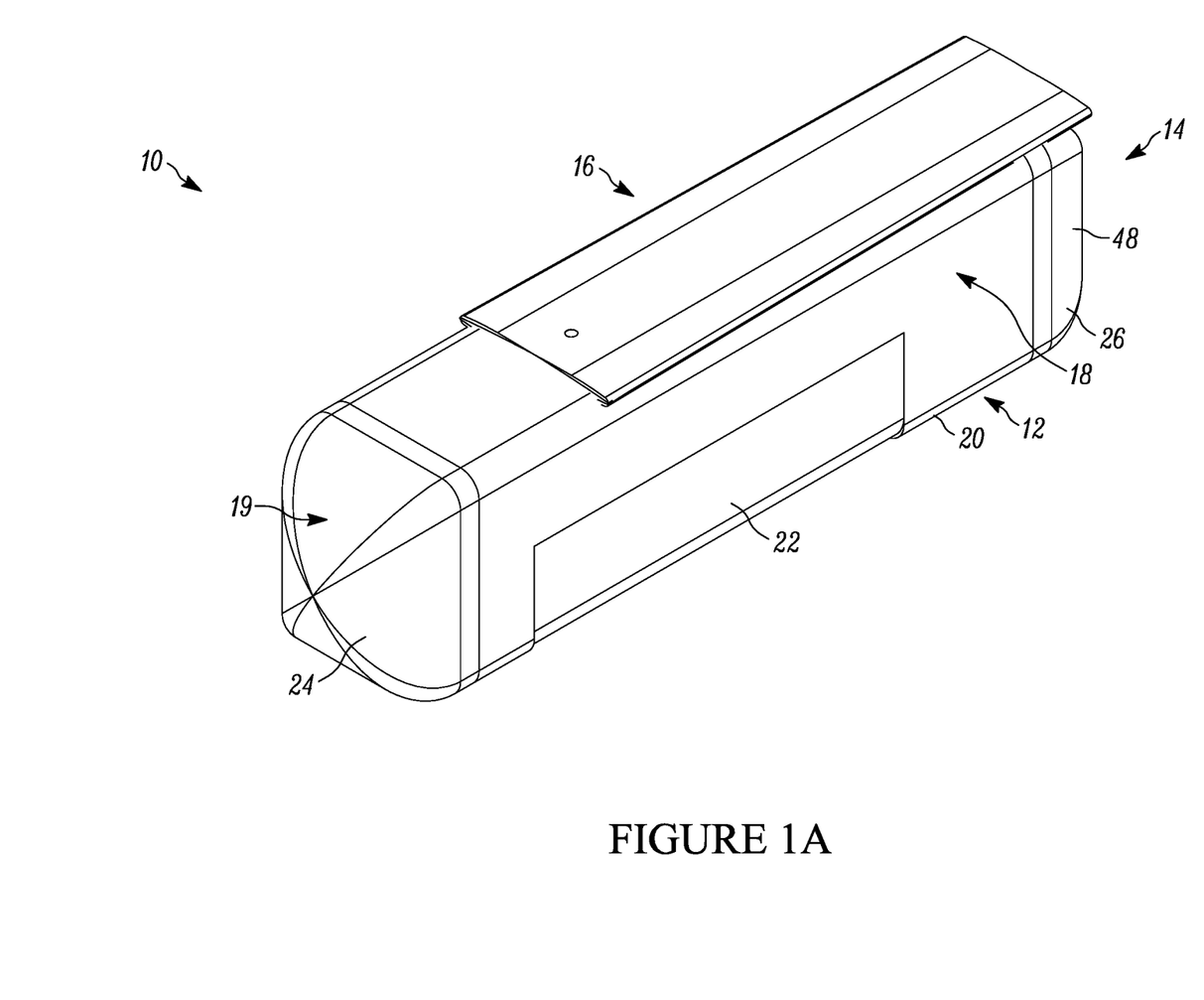

Referring now to the drawings and in particular to FIGS. 1 and 1a, the precision delivery vehicle is shown generally at 10. As will be explained hereinbelow, the precision delivery vehicle is configured to deliver a payload to a desired destination location with precision. It is contemplated that such a precision delivery vehicle is autonomous and does not require control once launched. Typically, although not required, it is contemplated that the precision delivery vehicle is ejected or otherwise deployed from an aircraft at altitude and which is flying a safe distance away from the desired destination location. It is contemplated that such distances may be upwards of 20 miles, for example. Of course, the precise distance away from the desired destination location that the precision delivery vehicle is launched is not limited to any particular distance, and, in some instances, such a distance may be more or less than that which is set forth above.

Additionally, there is no limitation on the type of craft from which the precision delivery vehicle can be launched or otherwise released. For example, the launch aircraft or vehicle may comprise an airplane (wherein the precision delivery vehicle may be suspended from the aircraft, such as from a wing, or stored within the fuselage). In other configurations, an expendable vehicle (such as a rocket or the like) can be utilized to raise the precision delivery vehicle to adequate altitude. In still other configurations, a rotorcraft, such as a helicopter, or a gyroplane, for example, may be utilized to lift the precision delivery vehicle to adequate altitude. It will be understood, further, that the adequate altitude may vary depending on the application. For example, in some configurations, the adequate altitude may be 500 feet, whereas in other configurations, the adequate altitude may be as much as 50,000 feet, on any altitude therebetween. Of course, these are merely examples, and the adequate altitude may be both less than 500 feet and in excess of 50,000 feet.

Referring now to FIGS. 1 through 4, the precision delivery vehicle 10 may include vehicle body assembly 12, fixed wing stabilizer system 14, fixed wing system 16, rotor system 18 and guidance system 19. A number of different dimensions are contemplated for the different structures, and some of such dimensions will be discussed below with the understanding that these dimensions are exemplary and not to be deemed limiting.

With reference to FIGS. 1, 1a and 2, 2a, collectively, the vehicle body assembly 12 includes central elongated fuselage 20, payload container 22, nose portion 24 and tail portion 26. In the configuration shown, the central elongated fuselage 20 comprises an outer body 32 that extends between first end 30 and second end 31. The outer body 32 defines an inner cavity 33. In the configuration shown, the inner cavity is substantially of a uniform configuration which may be of a generally square or rectangular configuration. Of course, in other configurations, other shapes are contemplated, including circular, oval or elliptical, as well as polygonal and other configurations. Indeed, the disclosure is not limited to any particular configuration of the fuselage. The fuselage may comprise a molded, extruded (or pultruded) member of a metal alloy, polymer or composite structure. In other configurations, the fuselage may comprise a structure formed with a frame having a skin thereover, wherein the skin may be formed from any one of the foregoing materials, and further comprising wood, fabric, among others. Any number of constructions, many of which are known in the art of airborne vehicle construction are contemplated for use. It is contemplated that, for example, the vehicle body assembly may be 24"×30" by 120", while other sizes are contemplated. Such a size is intended to be exemplary and not to be limiting.

Figure 2:
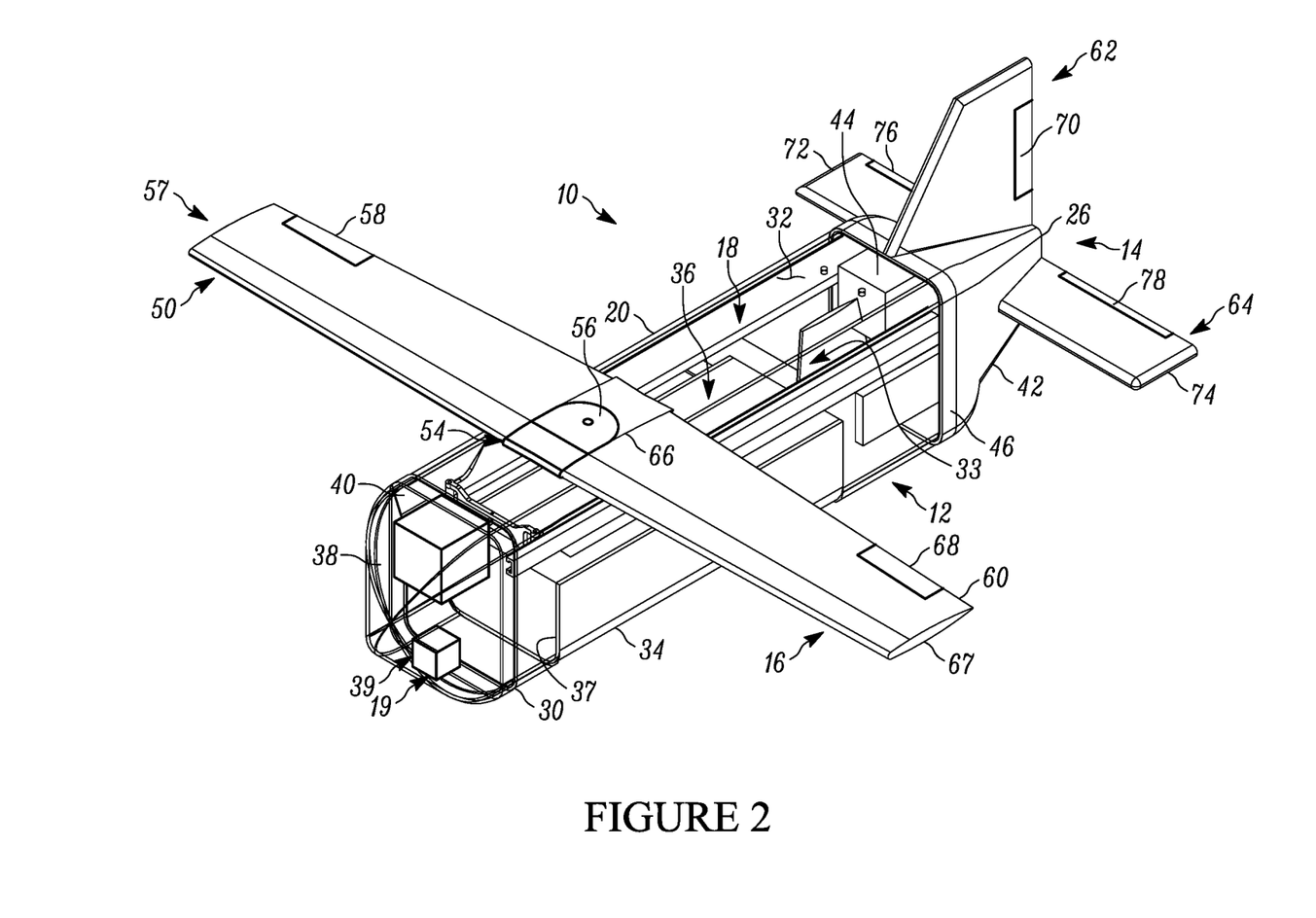
Figure 2A:
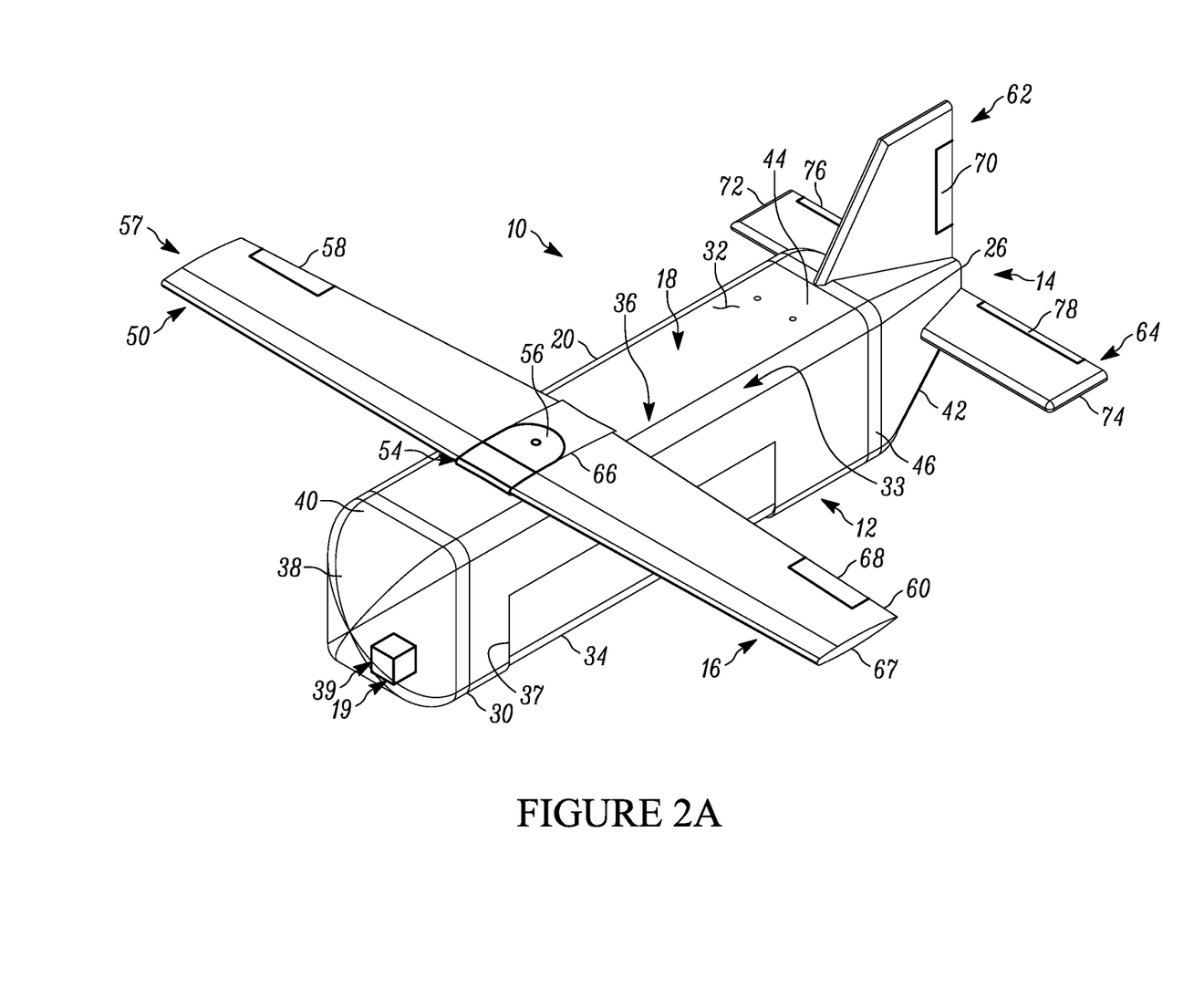

The payload container 22 is shown in FIG. 2, collectively, as comprising outer surface 34, payload cavity 36 and coupling structure 37. In the configuration shown, the central elongated fuselage may have an opening through the outer body. The payload container is configured to fit within the opening so that the outer surface matches and corresponds to the shape of the central elongated fuselage. The coupling structure 37 attaches, preferably releasably, to the central elongated fuselage. In the configuration shown, the payload cavity 36 is substantially entirely contained within the inner cavity 33 of the central elongated fuselage 20. The payload cavity may be completely sealed from the remainder of the inner cavity, or may be open to the inner cavity. Additionally, it is contemplated that the payload container may comprise several separate structures, each of which can be coupled to each other and/or to the central elongated fuselage.

In other configurations, the payload container may be of a shape that does not correspond to the central elongated fuselage, per se, but which is attached or otherwise coupled to the outer body of the central elongated fuselage. In some instances, the payload container may extend along the length of a surface of the central elongated fuselage. In other instances, the payload container may surround multiple portions of the central elongated fuselage. In still other configurations, the payload container may be an extension of the central elongated fuselage in that it may be attached to one of the first or second end and may have a configuration that substantially matches the cross-sectional configuration of the central elongated fuselage.

In other configurations, the payload container may be integrally formed with the central elongated fuselage, and, may, for example, be accessible through an opening in the outer body 32 of the central elongated fuselage. In other instances, the access to the payload container may be through the first or second end of the central elongated fuselage (when the nose portion 24 or the tail portion 26 are removed or partially removed). In still other configurations, the payload container 22 may comprise a structure which can be separate and attachable to the central elongated fuselage within the inner cavity 33.

As will be understood, the particular configuration and the particular positioning of the payload container is not limited to the foregoing, and other configurations are likewise contemplated. It will further be understood that the type of payload that is contained within the payload container can be varied without limitation. It is contemplated that in the above described vehicle body assembly, a payload envelope may be approximately 16"×24"×60", while other sizes are contemplated. Again, this sizing is exemplary and not to be deemed limiting.

The nose portion 24 is shown in FIG. 2. The nose portion, in the configuration shown, includes outer surface 38, inner cavity 39 and fuselage interface coupling 40. It is contemplated that the nose portion comprises an aerodynamic structure that forms the front of the precision delivery vehicle when in fixed wing flight (powered or gliding). As such, the outer surface of the nose portion may be formed into a conical or outwardly convex structure to aid in aerodynamics and flight. It is contemplated that the nose portion further comprises a cushioning or resilient coating over at least a portion of the outer surface, as the nose portion may comprise the base of the precision delivery vehicle in the rotor craft controlled portion of the travel of the precision delivery vehicle (typically, the final stages of delivery). As such, this portion will tend to hit the ground first.

It will be understood that the inner cavity 39 may include portions of the guidance system 19. The nose portion is coupled to the payload container about the outer perimeter of the first end by way of fuselage interface coupling 40. In some configurations, the two structures are bonded together. In other configurations, the nose portion can be removably coupled to the first end 30 of the central elongated fuselage with fasteners, straps or the like. It will further be understood that the inner cavity 39 may also include space within which a payload can be contained. It will further be understood that in some configurations, the nose portion may be removed (instead of the tail portion described below) to access and retrieve the rotor system 18. In such configurations, portions of the guidance system can be maintained with the tail portion.

The tail portion 26 is shown in FIG. 2 as comprising body outer surface 42, cavity 44 and fuselage interface coupling 46. The tail portion interfaces with the central elongated fuselage 20 at the second end thereof. The fuselage interface coupling may comprise a releasable coupling which can be activated to release the tail portion 26 so as to access and retrieve the rotor system 18. As will be described below, the fixed wing stabilizer system 14 may be mounted to the tail portion 26. Depending on the configuration, the tail portion may comprise a foldable metal or wood frame with rigid fixed wing stabilizer system, all of which or some of which may be covered with fabric, for example. In other configurations, the tail portion 26 may comprise an inflatable portion (with the fixed wing stabilizer system being, at least partially inflatable or rigid). In a configuration wherein the tail portion is first collapsed, a strap, cap or cover 48 (FIG. 1) may be presented or maintained over the collapsed tail portion. It will be understood that at a predetermined time, the strap, cap or cover can be removed, and the tail portion can be articulated through the use of spring loaded configurations, reliance on the relative velocity of the precision delivery vehicle, or, inflated by, for example, a compressed air cartridge. In some configurations, a drogue chute or the like can be deployed to urge the release of the strap, cap or cover.

In other configurations, the tail portion 26 can be inflatable, wherein the inflation occurs prior to deployment. In still other configurations, the tail portion may be rigid and collapsed or articulated into the desired configuration prior to deployment or with deployment. In still other configurations, the tail portion, or portions thereof, may be integrally formed with the central elongated fuselage 20 (i.e., foldable, that is selectively deployable and collapsible so that it stays with the delivery vehicle to the ground). In some such configurations, the tail portion comprises several components, which are releasably coupled together.

The fixed wing stabilizer system 14 is shown in FIG. 2 as including vertical stabilizer 62 and horizontal stabilizer 64. The fixed wing stabilizer system, in the configuration shown, is coupled to the body outer surface 42 of the tail portion 26. It will be understood that the vertical stabilizer or the horizontal stabilizer may be coupled to (i.e., extend from) the central elongated fuselage 20 (where they may remain fixed, during rotor based flight, or jettisoned). It will be understood that the fixed wing stabilizer system includes control surfaces, such as, for example, rudder 70 on the vertical stabilizer 62, as well as elevator 76 on a first side 72 of the horizontal stabilizer 64 and elevator 78 on a second side 74 of the horizontal stabilizer 64. It will further be understood that in the place of a vertical and horizontal stabilizer, a v-tail or the like may be employed wherein the control surfaces comprise ruddervators or the like.

The fixed wing system 16 is shown in FIG. 2 as comprising first foldable wing 50, second foldable wing 60 and pivot structure 54. The first foldable wing 50 includes root end 56 and distal end 57. The second foldable wing 60 includes root end 66 and distal end 67. The pivot structure includes a pivot point or pivoting path for the first foldable wing and the second foldable wing to extend from a first collapsed configuration to a second deployed configuration. In the configuration shown (FIG. 1), in the collapsed configuration, the first and second foldable wings are positioned along or over a portion of the central elongated fuselage. In the deployed configuration, the wings are rotated, pivoted or otherwise directed into the deployed configuration wherein the distal ends of the foldable wings are spaced apart from the central elongated fuselage (and in part one of oblique and substantially perpendicular, which includes perpendicular, thereto). In the configuration shown, the foldable wings both extend over the top portion of the central elongated fuselage, whereas in other configurations, they may extend along either side of the central elongated fuselage (wherein the pivot structure directs pivoting of the foldable wings in multiple dimensions). In other structures, the foldable wings may extend from within the inner cavity of the central elongated fuselage. It is contemplated that, in other configurations, the fixed wing system can be eliminated, and instead, only the rotor system can be supplied (along with, in some configurations, a surface or structure which can provide yaw control).

As will be explained below, the movement of the foldable wings from the first collapsed configuration to the second deployed configuration can be accomplished through a number of different structures. In some configurations, a drogue chute can be employed to deploy the foldable wings. In some such configurations, the drogue chute may be the same drag chute that is employed to articulate the tail portions.

It will be understood that in other configurations, the foldable wings may be directed into the deployed configuration prior to launching or deploying the precision delivery vehicle from an aircraft, for example. In other configurations, the foldable wings may comprise a single wing that is rotated or pivoted at a midpoint thereof (or at a point between the ends, wherein the wing is intended to be asymmetrical). It is contemplated that the foldable wings may comprise a rigid structure, a rigid structure coupled to an inflatable structure, or a rigid frame (formed from metal, wood, form or a polymer) with a skin (such as fabric, film or the like).

In still other configurations, the wings may be fixed structures that are releasably, or permanently coupled (that is fixed or foldably selectively movable) to the central elongated fuselage. Such fixed wings may be coupled prior to lifting the precision delivery vehicle to the desired deployment altitude. In other instances, the fixed wings may be affixed just prior to deployment at the deployment altitude. It will be understood that, in the example of the vehicle body assembly above, the foldable wings may be positioned 36" aft of the first end 30, and may be approximately up to 84" in length. Again, it will be understood that the size of the wings described herein is to be exemplary, and not to be deemed limiting. Wings of greater or lesser size, as well as vehicle body assemblies of larger and smaller configuration are contemplated.

It will be understood that the wings may include control surfaces which can be controlled through the guidance system 19. Such control surfaces may include aileron 58 coupled to the first foldable wing 50 and aileron 68 coupled to the second foldable wing 60. Other control surfaces may likewise be presented. These surfaces can be coupled to servomotors which, as indicated, can be controlled by the guidance system.

Figure 3:
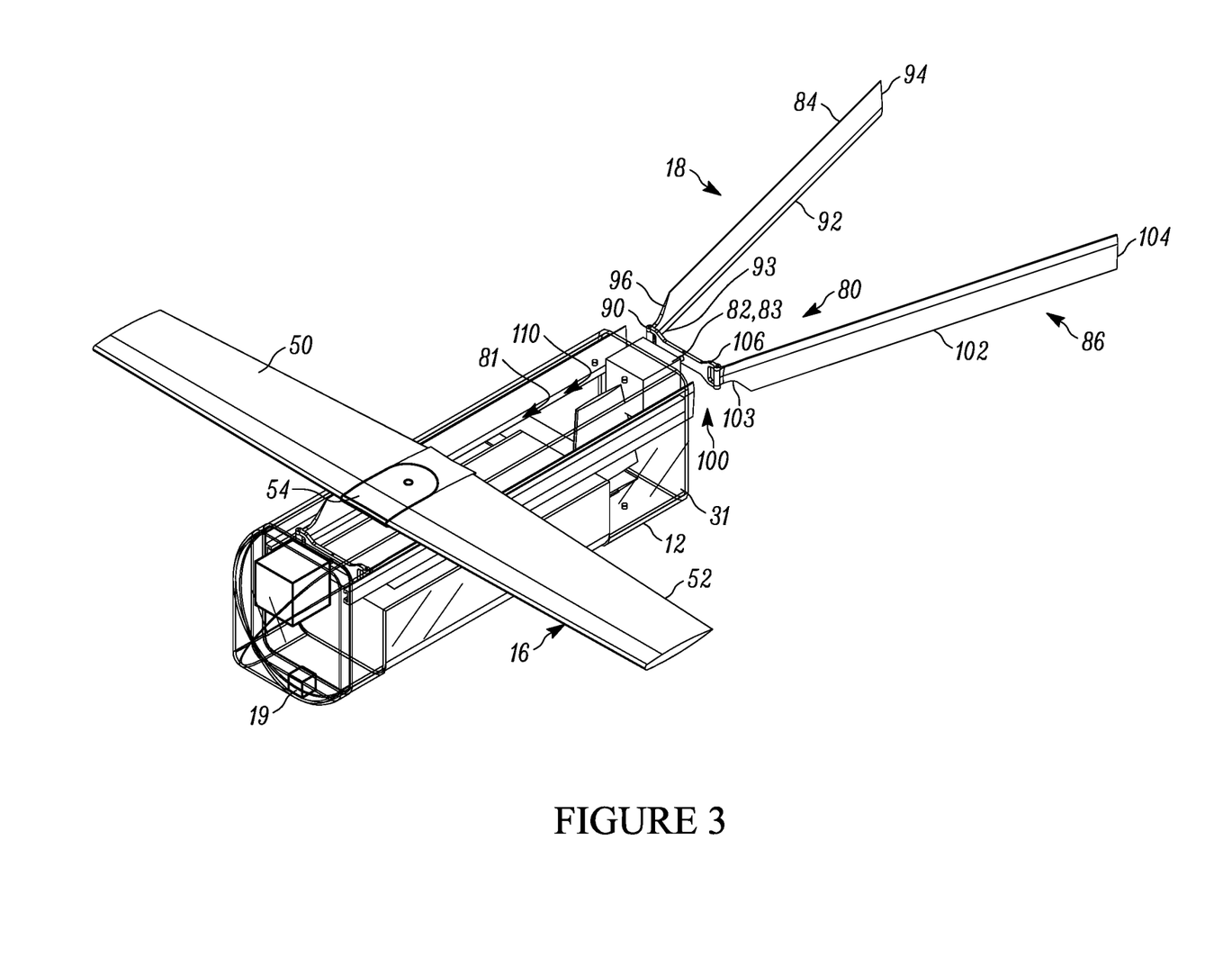
FIG. 3 of the drawings is a perspective view of a configuration of the precision delivery vehicle showing deployment of the rotor system, after jettisoning of the tail portion and the fixed wing stabilizer system, and prior to jettisoning one of the foldable wings of the fixed wing system.
Figure 4:
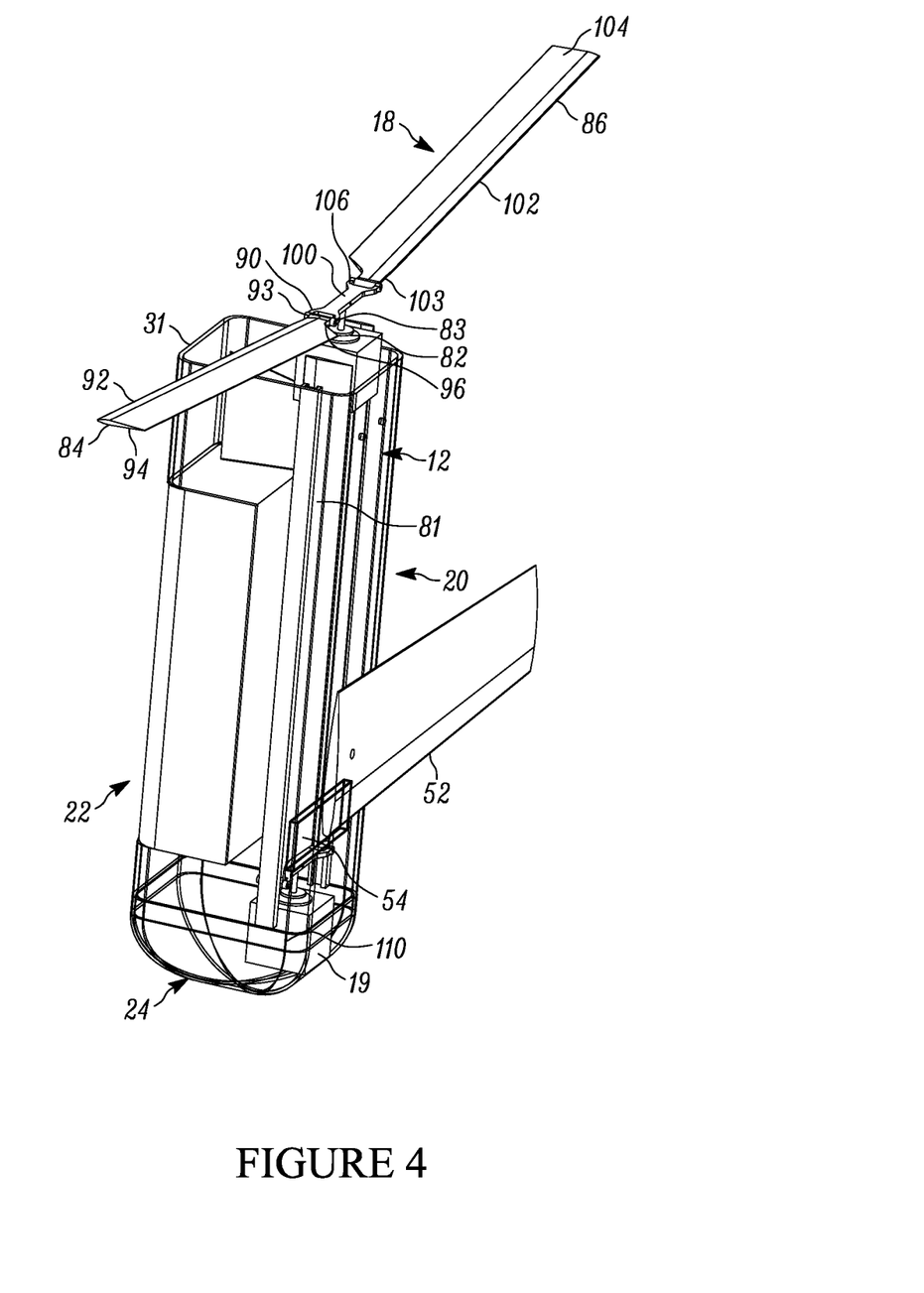
FIG. 4 of the drawings is a perspective view of a configuration of the precision delivery vehicle showing deployment of the rotor system, and after jettisoning of one of the foldable wings of the fixed wing system, with the precision delivery vehicle having the nose portion facing the ground and having the rotor system controlling the flight.

The rotor system 18 is shown in FIGS. 3 and 4 as comprising rotary flight assembly 80 and rotary deployment system 81. The rotary flight assembly 80 comprises mast structure 82, rotor hub 83, first blade 84 and second blade 86. The mast structure 82 is coupled to the vehicle body assembly (in a slidable configuration relative thereto, as will be explained). The rotor hub 83 rotates about a portion of the mast structure 82 which forms an axle for the rotor hub 83. The first blade 84 and the second blade 86, as will be explained, extend from the rotor hub 83 and are rotatable along with the rotor hub about the mast 82. In the configuration shown, the first and second blades are rigidly coupled to the rotor hub, thereby defining fixed pitch rotor blades, with the mast being movable relative to the vehicle body assembly so as to achieve rotor roll-and-pitch control. It is contemplated that, in the example set forth above, the first and second blades can have a 9 foot chord and a 19 foot diameter. It is contemplated that such blades may rotate at, for example, 450 revolutions per minute (rpm), and, at a zero forward speed, can carry a 500 pound vehicle weight at a sink rate of approximately 13 to 16 feet per second. Of course, again, such an embodiment is meant to be exemplary and the performance, dimensions and configurations of the same are not intended to be limiting.

In other configurations, the blades may be adjustable relative to the rotor hub, thereby allowing for variable pitch rotor blades. Such configurations are disclosed in U.S. Pat. No. 8,668,162 issued to Sonnenborn and U.S. Pat. No. 9,022,314 issued to van der Westhuizen, both of which are assigned to Skyworks Global Inc., and both of which are hereby incorporated by reference in their entirety. In such case, the pitch of the blades can further be controlled independently. For example, in such a system, the first and second blade may include a full feathering mechanism, which can cause changes to the disk plane, to, in turn, control the pitch and roll of the vehicle body assembly.

In some such configurations, blade pitch may also be changed, collectively, to optimize the lift and drag of the system as a whole. This type of system has slightly greater complexity and more moving parts than a fixed-pitch system, including the need for a third servomotor. In return for the added complexity, this type of system provides further control of the precision delivery vehicle, which is especially useful at touch-down. If the collective pitch of the rotors is increased when the nose is a few feet above the ground, significant braking can be realized and a soft touch-down can occur. This braking is, as will be understood, relatively short-lived as the rotor loses energy and slows rotation relatively quickly.

In still other such configurations, the disk plane can be changed by the tilting of the rotor hub by it being attached to a 'gimbal' head mount with the ability to move in all directions. Once the total gross weight of the precision delivery vehicle reaches a certain weight or heaver, it may be advantageous to have the rotor hub and mast structure be a cyclic pitch controlled system to mitigate the higher control force loads. Collective pitch change is available to both types, but its design and how it functions is different for each and in many instances not readily interchangeable.

While it will be understood that in some configurations, a greater number of rotor blades (i.e., in excess of 2 rotor blades) may be provided, in the configuration shown, a pair of opposed rotor blades are disclosed. In such a configuration, the first rotor blade comprises a root portion 90 and an elongated blade portion 92. The elongated blade portion 92 extends from proximal end 93 to distal end 94. A hinge coupling 96 couples the root portion 90 to the elongated blade portion 92 at the proximal end 93 thereof. The root portion 90 is coupled to the rotor hub 83 (and may be integrally formed therewith). Similarly, the second rotor blade 86 comprises a root portion 100 and an elongated blade portion 102. The elongated blade portion 102 extends from proximal end 103 to distal end 104. A hinge coupling 106 couples the root portion 100 to the elongated blade portion 102 at the proximal end 103 thereof. It will be understood that the elongated blade portion of each of the first and second blades can rotate about the respective hinge couplings from a collapsed configuration wherein the elongated blade portions are rotated through approximately 90° of rotation. In other configurations, it may be necessary to rotate through more than 90°, while in other configurations, the rotation may be less than the foregoing.

In the configuration shown in FIGS. 1 and 2, collectively, the rotary flight assembly 80 is initially maintained within the inner cavity 33 of the central elongated fuselage 20. Initially, the mast structure 82, along with the rotor hub 83, are positioned proximate the first end 30 thereof. The elongated blade portions 92 are positioned along the central elongated fuselage between the first and second ends thereof within the inner cavity. In such a configuration, the rotary deployment system 81 includes slidable release and retention structure 110 wherein rails within the inner cavity 33 interface with corresponding structures on the mast structure 82 to allow slidable movement of the mast structure between the first and second ends. It will be understood that stops or other structures may be employed to maintain the mast structure at or near each of the first and second ends. In such a configuration, additional rails or holds may be provided for capturing and/or retaining the elongated blade portions of the first and second blades to maintain the same along the central elongated fuselage within the inner cavity. In such a configuration, the activation subsystem may comprise a drag chute that is deployed as, for example, the tail portion 26 is released from the central elongated fuselage 20. In other configurations, the activation subsystem may comprise a pyrotechnic charge or a spring loaded catapult or the like which can direct the mast structure toward the second end, to direct the first and second blades out of the second end of the central elongated fuselage 20. It will be understood that the rails, in some of the configurations, may be integrally formed with the central elongated fuselage, or may be coupled thereto and form a part thereof. It will further be understood that a sock or other covering may be placed over the first and second blades to maintain the blades together, and to limit interference between the blades and other structures within the central elongated fuselage.

Figure 6:
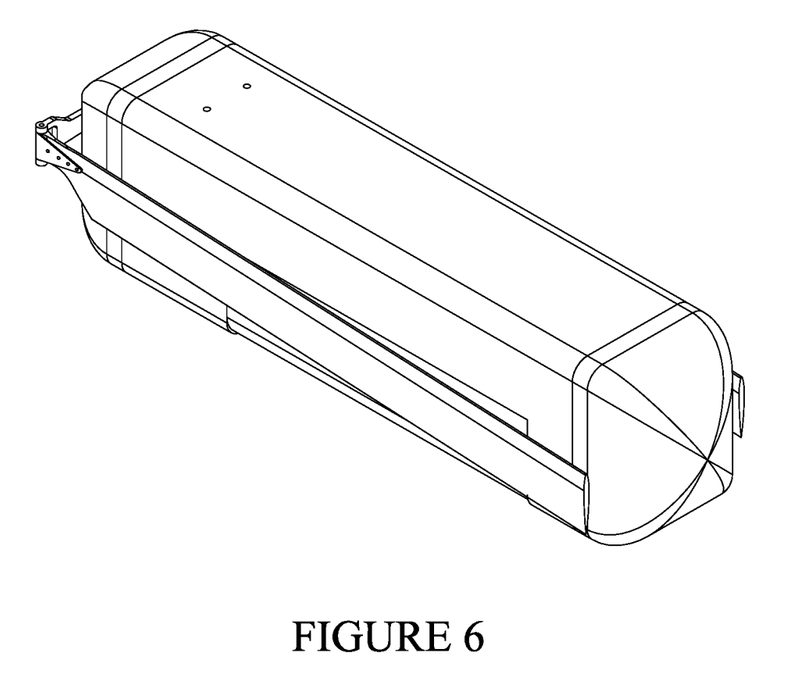
FIG. 6 of the drawings is a perspective view of a configuration of the precision delivery vehicle showing the rotor system in a stowed configuration along the outside of the vehicle body assembly.

In another configuration, such as the configuration of FIG. 6, the mast structure may be positioned proximate the second end of the central elongated fuselage 20 (and/or within the cavity 44 of the tail portion 26). In such an instance, the elongated blade portions 92, 102 of the first blade 84 and the second blade 86 can be maintained along the outer body 32 of the central elongated fuselage. Releasable straps or other retaining structures may be employed to releasably retain the elongated blade portions in a collapsed configuration. These portions can be released by the activation sub-assembly. Any number of structures for retaining the elongated blade portions are contemplated, including but not limited to clamps, magnetic structures, straps buckles and/or combinations of the foregoing.

In still other configurations, the rotor blades may be slidable relative to the hub, which would preferably then be at a fixed position at the tail, where, the rotor blades slide relative to the hub from a stowed configuration to a deployed configuration relative thereto. In such a configuration, the rotor blades could be stowed one either the inside or the outside of the vehicle body.

Figure 5:
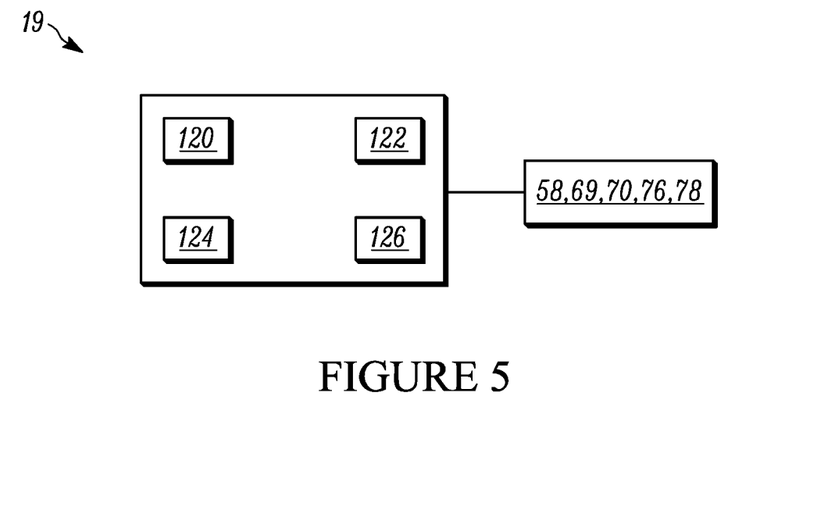
FIG. 5 of the drawings is a schematic representation of the guidance system of the precision delivery vehicle of the present disclosure.

The guidance system 19 is shown in greater detail in FIG. 5 as comprising control system 120, sensor system 122 and communication system 124. The guidance system 19 can be powered by power supply 126. It will be understood that the control system 120 is coupled to the sensor system 122 and includes couplings to the different flight control surfaces of the fixed wing flight structures and also to the control structures of the rotary blade structures. The sensor system provides various inputs to the control system from which the control system can direct the control surfaces and control structures as well as the different controllable systems (such as, for example, the release of the tail section, the deployment of the foldable wings, etc.). A communication system 124 may be provided through which communication with the ground can be maintained, and wherein the directives can be provided to the control system (to allow, for example, for remote control, or the downloading of various information, such as target destination changes and the like). In some configurations, the communication system may be omitted wherein the precision delivery vehicle is completely autonomous.

Figure 7:
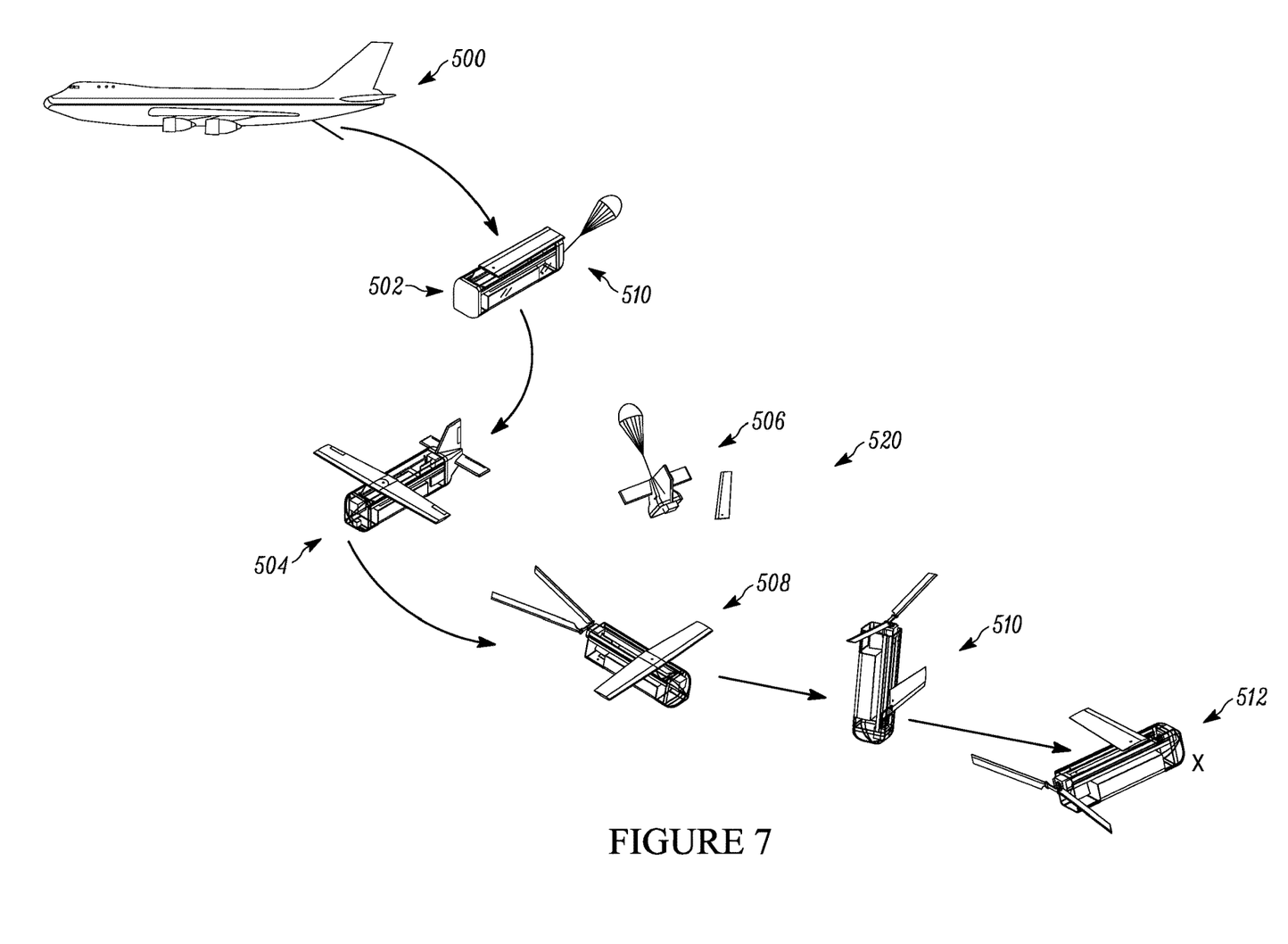
FIG. 7 of the drawings is a schematic representation of the three part mission contemplated for the precision delivery vehicle of the present disclosure.

With reference to FIG. 7, the operation of the device will be described with the understanding that, as set forth above, a number of different configurations are contemplated, as well as a multitude of different launch or deployment scenarios. In many instances, the precision delivery vehicle contemplates a three step mission. The first step 500 is the delivery of the precision delivery vehicle to the appropriate altitude and launch or deployment therefrom. The second step 510 is the deployment of fixed wing structures to facilitate the fixed wing gliding or the like. The third step 520 is the deployment of rotor blades for rotative flight for final descent and precise landing at the target.

As space is typically a premium, the precision delivery vehicle is preferably in a stowed or collapsed configuration for the first step. For example, the wings, the tail and the rotors can be folded, with some of the components stored inside, and others stored outside, of the central elongated fuselage. Additionally, the payload container may be filled at such time, or may have been prefilled, prior to launch of the delivery vehicle.

Once the correct or desired location of the drop has been established, the precision delivery vehicle can be launched, dropped, released or otherwise removed from the delivery vehicle at step 502. As the precision delivery vehicle is launched, the vehicle begins to respond to the forces of gravity. Eventually, the fixed wing system and the fixed wing stabilizer systems are activated to deploy the first foldable wing, the second foldable wing, and the stabilizers. As set forth above, the foldable wings may be positioned in a number of different stowed configurations, as can the stabilizers. In other configurations, these systems may already be deployed. A drogue chute at step 502 can be deployed to deploy the components of the fixed wing system and the fixed wing stabilizer system (it may omitted in other configurations).

Eventually, due to the fixed wing system and the fixed wing stabilizer system configuration, the precision delivery vehicle enters the portion of the mission that entails fixed wing gliding at 504. The guidance system can direct the control surfaces of the fixed wing system (the ailerons 58, 68 of FIG. 2) through servomotors and the like, as well as the control surfaces of the stabilizer system (the rudder 70 and the elevators 76, 78 of FIG. 2) through servomotors and the like, so as to place the precision delivery vehicle on the proper course toward the desired target.

Eventually, the precision delivery vehicle reaches the proximity of the target. At a point determined by the guidance system, the precision delivery vehicle begins transformation into a rotorcraft. To achieve such a transformation, the activation subsystem of the rotary deployment system can be activated (such a subsystem may comprise a drogue chute or may comprise a coupling to the tail portion), at step 506. In the configuration shown, again, at 506, the tail portion is released, thereby, through the rotary deployment system, directing the placement of the rotary flight assembly into the desired operational configuration. Again, in other configurations, as set forth above, it may be desirable to have no detachable components, and the entire delivery vehicle, with all components, may reach the landing spot. In such a configuration, the surfaces that are not to be utilized can return to a stowed configuration, instead of being jettisoned.

With reference to step 508, where the rotary flight assembly is maintained within the central elongated fuselage, the mast structure slidably moves along the inner cavity of the central elongated fuselage toward the second end. Once at the second end, it will be understood that the previously maintained first and second blade have exited the inner cavity 33 of the central elongated fuselage.

When the blades are freed into the slip stream, the longitudinal airflow over the blades causes rapid spinning of the rotor hub and the blades about the mast structure. With continued reference to step 508, the resulting centrifugal force causes the first and second blade to swing outwardly, gaining more efficient airflow over the blades and accelerating the revolutions of the rotor hub and the blades. As the blades increase in speed, the centrifugal forces increase as well, swinging the first and second blade elongated blade portions relative to the root portions into full deployment at step 510. As the first and second blades reach full deployment at step 510, the blades increasingly decelerate the vehicle. It is contemplated that a cog mechanism (not shown) can be utilized to ensure that the elongated blade portions deploy symmetrically. Once the elongated blades approach full deployment, the elongated blade portions can be allowed to flap independent of each other.

Where the mast structure is already proximate the second end, the elongated blade portions are positioned on the outer body of the central elongated fuselage, the airflow itself will direct the elongated blade portions into the deployed configuration. It will be understood that shock absorbers or other dampening structures may be positioned at the hub to prevent the blades from hitting each other during deployment.

As the elongated blade portions reach full deployment (i.e., the deployed configuration), the nose portion 24 begins to descend relative to the central elongated fuselage so as to have a substantially vertical orientation under the spinning rotary flight assembly at steps 508, 510. As the fixed wing system is no longer providing lift, it is contemplated that one of the first and second foldable wings are released (through a drogue chute, or other system at step 506, for example, or later), or re-folded or stowed, leaving only a single one of the first and second foldable wings. It will be understood that this remaining foldable wing increases area moment inches aft of the center of gravity. The remaining foldable wing precludes spinning about the yaw axis due to, for example, friction in bearings in the rotor hub and mast structure, allowing the guidance of the vehicle to be provided by rotor roll-and-pitch controls only. It will be understood that any structures of the fixed wing stabilizer system (that were not jettisoned upon launching of the rotor system), can be jettisoned, or may remain (i.e., stowed, folded, etc.).

As the precision delivery vehicle continues to descend at step 510, the guidance system controls the rotary flight assembly (through rotor roll-and-pitch control) so that the precision delivery vehicle is guided to the target. Continuous adjustment can be made so that the target is reached. It will be understood that in some configurations, the nose portion may include a resilient material to lessen the impact with the surface at the target (i.e., the ground). In other configurations, wherein the first and second blade have collective pitch control the collective pitch control can be utilized to reduce speed of the precision delivery vehicle at the target.

Once the precision delivery vehicle lands at step 512, those on the ground can access the payload container and remove the payload. In many instances, the precision delivery vehicle is contemplated to be disposable. That is, once the payload is removed, the remainder of the precision delivery vehicle can be discarded, or can just be left at the target. In other configurations, portions of the precision delivery vehicle, such as the guidance system, or the like, may be reusable. In such instances, those on the ground can separate the guidance system and remove the guidance system along with the payload. In still other configurations, the entirety, or substantially the entirety of the precision delivery vehicle can be retrieved for reuse.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A precision delivery vehicle comprising:
a vehicle body assembly having a central elongated fuselage, a nose portion at a first end of the central elongated fuselage and a tail portion at a second end of the central elongated fuselage, the vehicle body assembly configured to retain a payload;
a fixed wing stabilizer system positioned at the second end of the central elongated fuselage;
a fixed wing system positioned between the first end and the second end of the central elongated fuselage, the fixed wing system including:
a first foldable wing;
a second foldable wing; and
a pivot structure configured to direct the first and second foldable wings between a collapsed configuration and a deployed configuration;
a deployable and unpowered rotor system including a rotary flight assembly, the rotary flight assembly including:
a mast structure attached to the vehicle body assembly;
a rotor hub rotatably coupled to the mast structure;
a first blade hingedly coupled to the rotor hub; and
a second blade hingedly coupled to the rotor hub extending in a direction opposite the first blade;
wherein the rotor hub, the first blade and the second blade are structurally configured to freely rotate about the mast structure upon deployment, and whereupon deployment, the vehicle body is orientated such that the mast structure becomes the upper end of the vehicle; and
a guidance system structurally configured to alter the orientation of the first blade and the second blade relative to the vehicle body to direct the precision delivery vehicle to a target.

2. The precision delivery vehicle of claim 1 wherein the first blade and the second blade are positionable in a collapsed configuration and a deployed configuration, wherein in the collapsed configuration, the elongated blade portion of each of the first blade and the second blade are positionable so as to extend along an outer body or within an inner cavity of the central elongated fuselage.

3. The precision delivery vehicle of claim 1 wherein in a collapsed configuration, the first and second foldable wings extend along an outer body of the central elongated fuselage.

4. The precision delivery vehicle of claim 1 wherein one of the first foldable wing and the second foldable wing are removable after being positioned in the deployed configuration.

5. The precision delivery vehicle of claim 1 wherein the tail portion is releasably coupled to the central elongated fuselage.

6. The precision delivery vehicle of claim 1 wherein the tail portion is collapsible against the second end of the central elongated fuselage.

7. The precision delivery vehicle of claim 1 wherein the vehicle body assembly further includes a payload container releasably attachable to the central elongated fuselage.

\* \* \* \* \*